United States Patent [19]

VanderPol et al.

[11] Patent Number: 4,911,574

[45] Date of Patent: Mar. 27, 1990

[54] CAM LOCK FOR TOOL ELEMENTS

[75] Inventors: Jerald VanderPol, Eldorado Hills; Randall Schuster, Davis, both of Calif.

[73] Assignee: Tri Tool Inc., Rancho Cordova, Calif.

[21] Appl. No.: 203,911

[22] Filed: Jun. 8, 1988

Related U.S. Application Data

[63] Continuation of Ser. No. 945,905, Dec. 23, 1986, abandoned.

[51] Int. Cl.$^4$ .............................................. B25G 3/20
[52] U.S. Cl. ................................... 403/373; 403/331; 403/381; 82/158
[58] Field of Search ................. 403/333, 381, 373, 24; 82/36 R, 158

[56] References Cited

U.S. PATENT DOCUMENTS

| | | |
|---|---|---|
| 1,285,628 | 11/1918 | Craley . |
| 4,057,294 | 11/1977 | Krekeler ............................. 299/93 |
| 4,422,356 | 12/1983 | Pertle ................................. 82/36 R |
| 4,437,366 | 3/1984 | Astle .................................... 82/4 C |
| 4,674,908 | 6/1987 | Kagerer ............................. 403/109 |

FOREIGN PATENT DOCUMENTS 528621 11/1921 France .

Primary Examiner—Dave W. Arola
Attorney, Agent, or Firm—Bacon & Thomas

[57] ABSTRACT

A locking cam for locking a pair of tool elements together is disclosed. The locking cam member is rotatably mounted in one of the tool elements such that a clamping surface engages a female gib surface formed on the other tool element. Clamping screws exert a rotative force on the cam member so as to bring the clamping surface into contact with the female gib surface and forceably lock the tool elements together.

13 Claims, 5 Drawing Sheets

CAM LOCK FOR TOOL ELEMENTS

This application is a continuation of application Ser. No. 945,905 filed Dec. 23, 1986, now abandoned.

BACKGROUND OF THE INVENTION

It is well known to use male and female gibs to form dove tail joints to slidably attach one tool element to another. While this structure readily facilitates the linear adjustment of one of the elements with respect to the other, it poses problems in regard to the clamping of the elements together in a desired position. It is known to provide an adjustment screw rotatably attached to one of the elements and threadingly engaging the other to facilitate their mutual adjustment and to hold them in position once they are adjusted. However, vibrations imparted to the elements in their normal usage will usually cause the adjustment screw to rotate, thereby altering the respective positions of the elements.

It is also known to utilize clamping screws engaging one of the elements and bearing against the other. However, due to the clearances necessary to allow the elements to slide with respect to one another, such clamping screws typically raise one of the elements with respect to the other, it poses problems in regard to the clamping of the elements together in a desired position.

It is also known to utilize clamping screws engaging one of the elements and bearing against the other. However, due to the clearances necessary to allow the elements to slide with respect to one another, such clamping screws typically raise one of the elements out of contact with the broad, bottom surface of the dove tail groove and place undue stresses on the angled sides formed by the gibs. When utilized in tools which must operate under severe load conditions, the useful life of the tool elements can be markedly reduced by such stresses.

Clamping screws entering the elements laterally must bear against one of the angled sides forming the gibs and, therefore, do not achieve an adequate clamping force. In order to increase the clamping force, it has become necessary to utilize a large number of clamping screws, thereby rendering the adjustment of the relative positions of the tool elements a time consuming and uneconomical process.

SUMMARY OF THE INVENTION

The present invention relates to a cam lock for clamping tool elements together in a desired orientation. The cam lock acts on the inclined surface of a female gib formed on one side of a groove in one of the tool elements. The other tool element is slidably received in the groove such that, as the cam lock is rotated, it exerts a force on the second tool element to force it against the opposite side of the groove as well as the base of the groove. The cam lock acts on a significant surface area of the gib so as to distribute the stresses over a maximum area. Furthermore, by urging the second tool element in contact with both the opposite side of the groove and the base of the groove, it enables the tool elements to be utilized under severe working conditions while maintaining them in their clamped positions.

The cam lock element is rotatably mounted within the second of the tool elements and defines a clamping surface and a force receiving surface. The clamping surface bears against the inclined side of the female gib, while the force receiving surface bears against an end of a force element, such as a threaded screw, which exerts a rotative force on the cam member.

DETAILED DESCRIPTION OF THE PREFERRED EMBODIMENT

Figure 4:
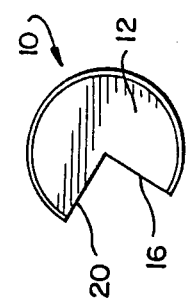
FIG. 4 is a side view of the locking cam member shown in FIG. 1.
Figure 2:
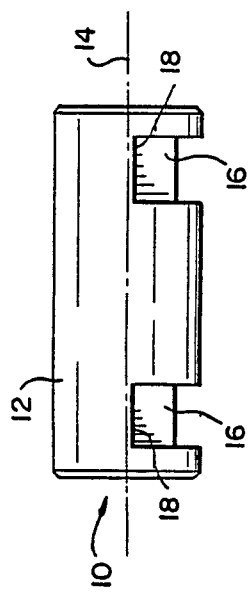
FIG. 2 is a top view of the locking cam member shown in FIG. 1.
Figure 1:
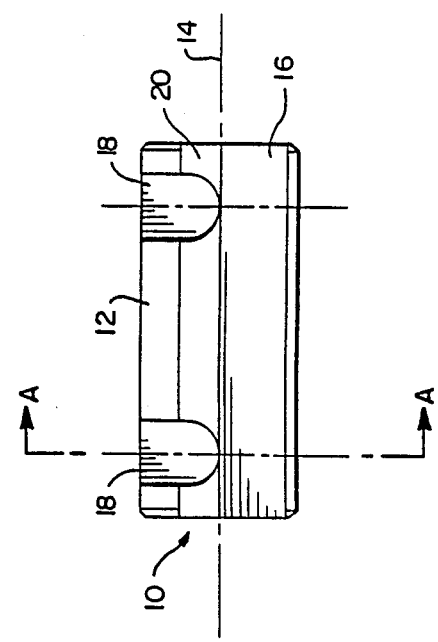
FIG. 1 is a front view of the locking cam member according to the invention.
Figure 3:
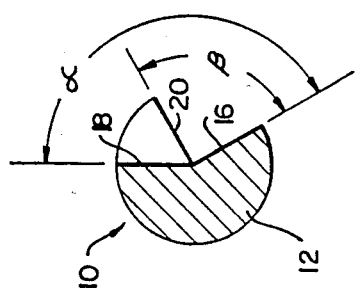
FIG. 3 is a cross-sectional view of the locking cam member taken along line A—A in FIG. 1.

The locking cam member 10 according to the invention is shown in FIGS. 1-4 and comprises a generally cylindrical body 12 having a longitudinal axis 14. Cylindrical body 12 defines a clamping surface 16 which extends substantially radially from longitudinal axis 14, as shown in FIGS. 3 and 4. A pair of force receiving surfaces 18 are also formed on the cylindrical body 12. Although the invention will be described as incorporating a pair of such force receiving surfaces, it is to be understood that more or less of these surfaces may be utilized without exceeding the scope of the invention. The exact number will vary according to the overall length of the locking cam member and the amount of clamping force that is required.

As shown in FIG. 3 the force receiving surfaces 18 also extend substantially radially outwardly from the longitudinal axis 14 and define an included angle with the clamping surface 16. Angle $\alpha$ is an obtuse angle and may be on the order of 150°. Clamping surface 16 defines an angle $\beta$ with respect to surface 20, which angle is approximately 90°.

Figure 5:
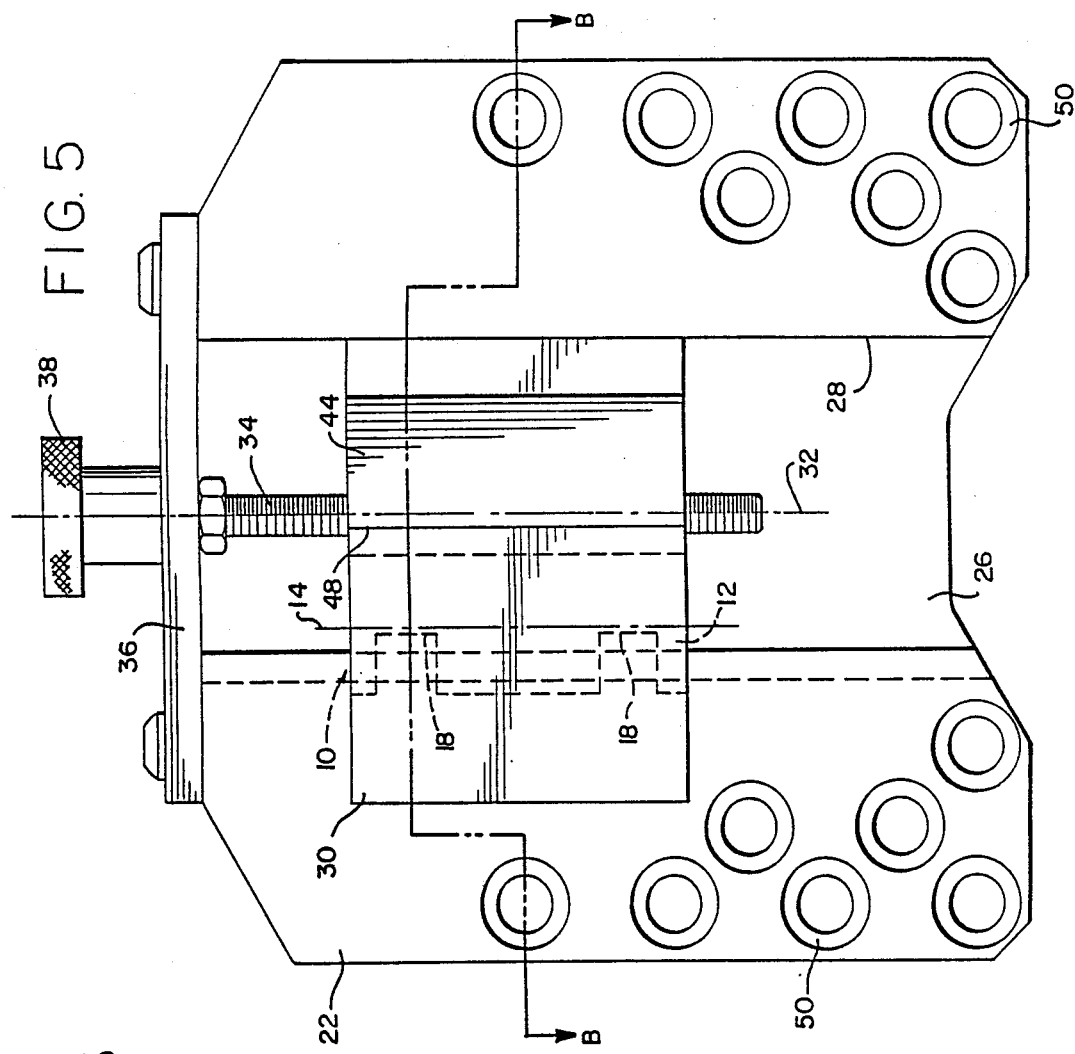
FIG. 5 is a front view of tool elements incorporating the locking cam member according to the invention.
Figure 6:
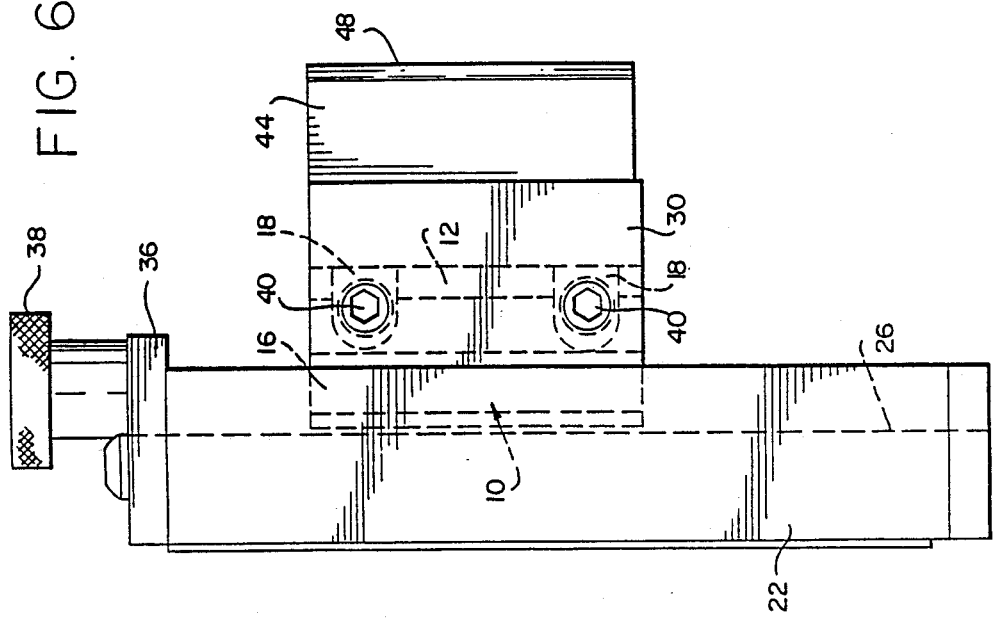
FIG. 6 is a side view of the tool elements shown in FIG. 5.
Figure 7:
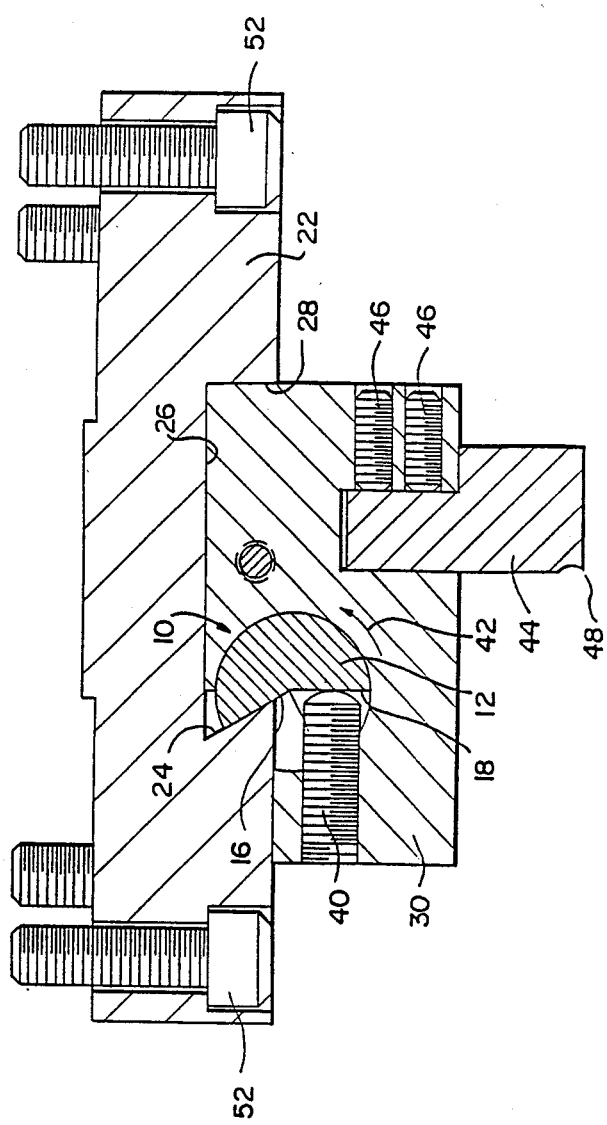
FIG. 7 is a cross-sectional view of the tool elements taken along line B—B in FIG. 5.

The locking cam member 10 is shown in its operative positions in FIGS. 5-7. A first tool element 22, which may be a mounting bracket or the like, defines a groove having a first side forming a female gib 24, a groove bottom 26 and a second, opposite side 28. As is well known in the art, female gib 24 defines an acute angle with bottom 26 as shown in FIG. 7.

A second tool element 30 is slidably received in the groove defined by tool element 22 such that it may be moved in a direction along axis 32, shown in FIG. 5. To facilitate this adjustment, adjusting screw 34 is rotatably mounted to bracket 36 which, in turn, is attached to tool element 22. Adjusting screw 34 threadingly engages tool element 30 such that rotation of knob 38 causes tool element 30 to traverse along axis 32.

Locking cam member 10 is rotatably mounted within tool element 30 such that its longitudinal axis 14 extends generally parallel to the direction of motion along axis 32. A pair of clamping screws 40 are threaded into tool element 30 such that their ends contact force receiving surfaces 18. As clamping screws 40 are threaded inwardly against the force receiving surfaces 18, the locking cam member 13 is caused to rotate about longitudinal axis 14 in a counterclockwise direction as indicated by arrow 42 in FIG. 7. Such rotation brings clamping surface 16 into contact with female gib 24 thereby exerting a force on tool element 30 causing it to move into engagement with bottom 26 and side 28 of the groove. The stresses imparted to tool element 30 during the tool operation are distributed over the contact area with bottom 26 and the side 28 of the groove, as well as the contact area between clamping surface 16 and female gib 24.

Tool element 30 may have a cutting tool 44 attached thereto via tool clamping screw 46, as shown in FIG. 7. Tool 44 typically has a cutting edge 48 which bears against the surface of the article to be machined or cut. Tool element 22 may also define a plurality of holes 50 to accommodate screws 52 or the like so as to attach the tool element to a machining tool or the like.

Figure 8:
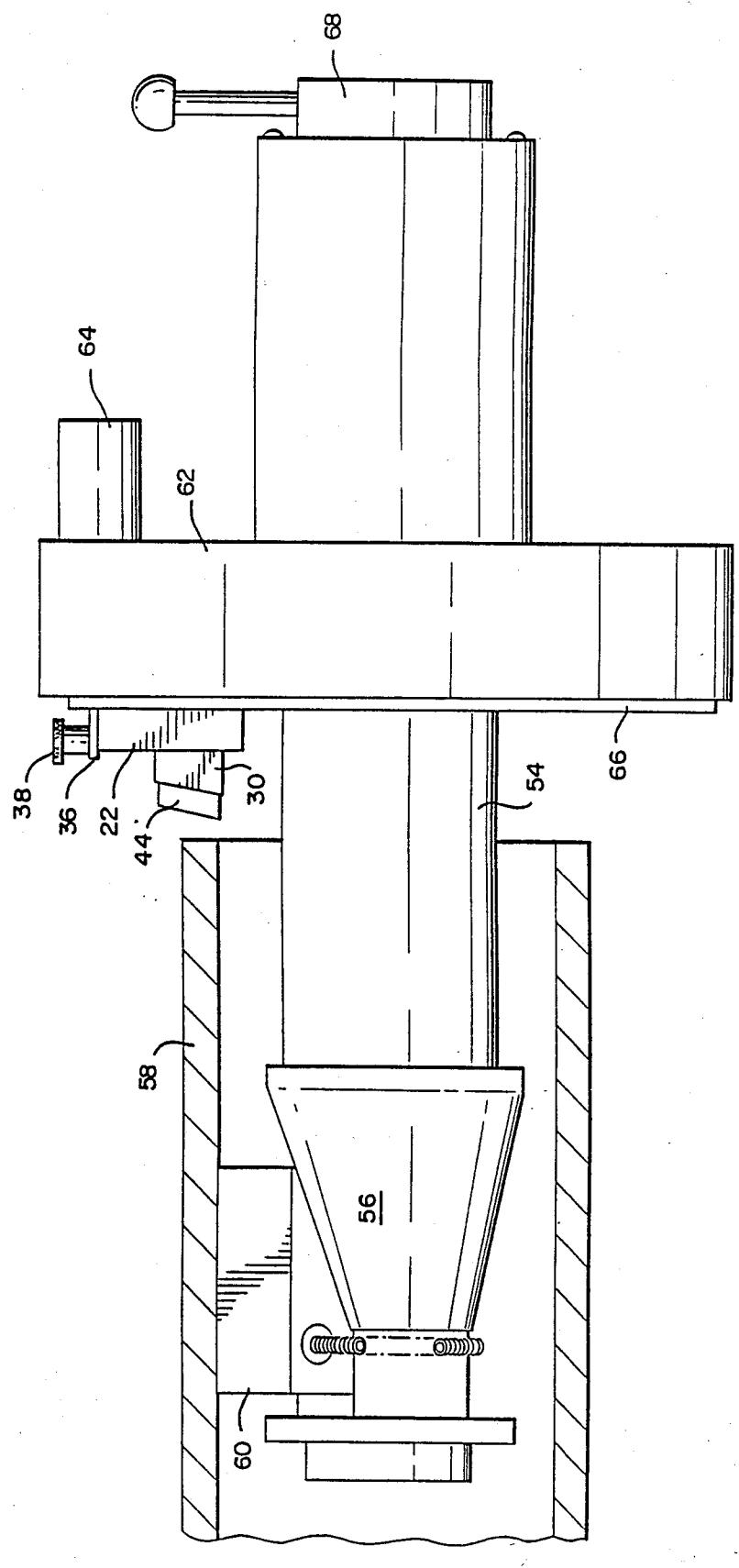
FIG. 8 is a side view of a portable lathe incorporating the tool elements shown in FIGS. 5-7.

Although the locking cam member according to the invention may be utilized with any type of tool, it has found particular application in conjunction with a portable lathe. Portable lathes, per se, are well known in the art and, as shown in FIG. 8, typically comprise a mandrel 54 having an expansible wedge mechanism 56 at one end to attach it to the interior of a pipe 58. Wedge clamping elements 60 expand radially outwardly to grip the interior of pipe 58. FIG. 8 shows only one such clamping member, however, it is understood that such members are usually equally circumferentially spaced about the wedge mechanism 56 to provide a uniform clamping force.

The portable lathe also includes a cutting head 62 which may have a drive motor 64 attached thereto so as to rotate a cutting wheel 66. The tool element 22 is typically attached to the face of the cutting wheel 66 via bolts 52. Second tool element 30 is adjusted with respect to tool element 22 so as to bring cutting tool 44 into proper alignment with the end of pipe 58. Once the proper alignment has been achieved, clamping screws 40 are tightened so as to rotate the locking cam member 10 and to rigidly affix tool member 30 in its desired position. The cutting head 62 is fed toward the end of pipe 58 so as to bring the cutting tool 44 into contact therewith by manual manipulation of feed mechanism 68. The specific details of the portable lathe such as the wedge clamping mechanism, the rotating mechanism, the cutting head and the feed mechanism form no part of this invention, and reference is made to U.S. Pat. No. 4,422,356 to Pertle and U.S. Pat. No. 4,437,366 to Astle for typical examples of portable lathe structures. The clamping member according to this invention may be utilized with any type of machine tool structure.

Figure 10:
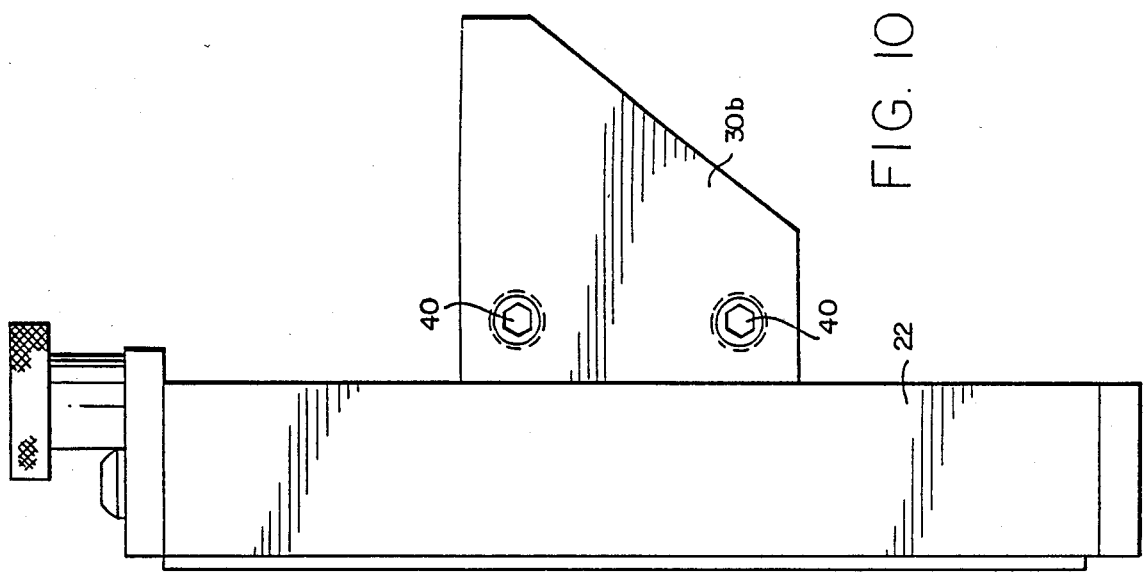
FIG. 10 is a side view, similar to FIG. 6, showing a second alternative tool holding member.
Figure 9:
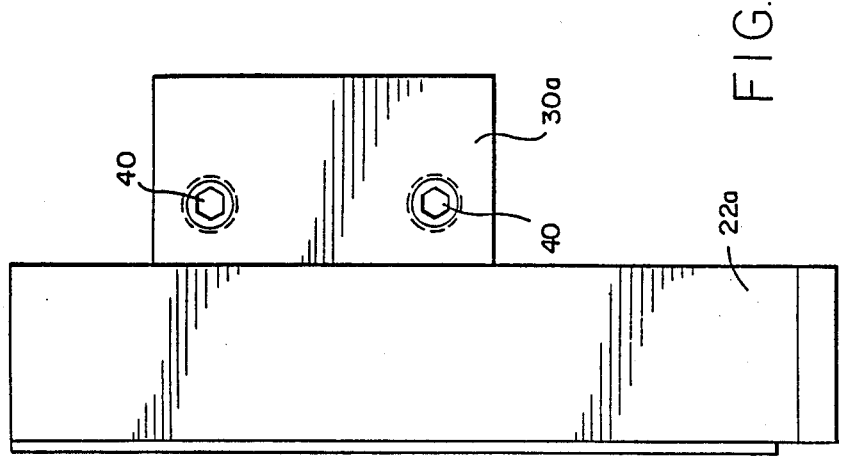
FIG. 9 is a side view, similar to FIG. 6, showing an alternative tool holding member.

Although a counterbore tool 44 is shown in FIGS. 5-8, it is to be understood that tool element 30 may be shaped so as to accommodate a facing tool, as shown by 30a in FIG. 9, or to accommodate a bevelling tool, as shown by 30b in FIG. 10. The tool element 30a in FIG. 9 may be used to clamp a facing tool (not shown) to a second tool element 22a. Although a manual adjustment screw is not shown in FIG. 9, the operative relationships between tool element 30a and tool element 22a are the same as that previously described. The clamping screws 40 perform precisely the same function as set forth in the previous embodiments.

FIG. 10 shows a tool element 30b to which may be attached a bevelling tool to form a bevel on the end of pipe 58. Quite obviously, the precise type of cutting tool does not alter the relationships between the first and second tool elements, and the locking cam member.

The foregoing is provided for illustrative purposes only and should not be construed as in any way limiting this invention, the scope of which is defined solely by the appended claims.

What is claimed is:

1. A locking device for tool elements joined together along contiguous joint surfaces including a gib groove comprising:

a first tool element including an elongated gib groove defined by at least a first sidewall constituting a gib surface and at least a second wall;

a second tool element disposed at least in part in the gib groove;

one of said tool elements including an opening having a cylindrical side wall portion having an axis of symmetry extending parallel to the gib surface;

a locking cam member having an external substantially cylindrical surface area mounted in close fitting relationship in said opening in said one of the tool elements, said cam member and opening having a coincident axis of symmetry extending parallel to the gib surface, with said cam member mounted for rotation about said axis with said cylindrical surface in contiguous relationship with said cylindrical side wall portion;

said cam member including a gib engaging clamping surface extending generally radially of said axis of symmetry and parallel to and adjacent said gib surface, and a force receiving surface extending generally radially of said axis of symmetry and circumferentially spaced from said clamping surface; and, at least one moveable force exerting means arranged so that upon its movement a force is exerted against said force receiving surface eccentric to the axis of symmetry of the cam member to produce a moment about said axis and rotation of said clamping surface relative to said sidewall portion to cause said clamping surface to transmit force resulting from movement of said force exerting means to said gib surface with said clamping and gib surfaces in contiguous relationship, said gib surface providing an impediment to rotation of said cam member about said axis in response to movement of said force exerting means, said second tool element reacting to said clamping force by exerting a reaction force against said groove second wall.

2. The locking device according to claim 1 wherein the clamping surface extends substantially the length of the locking cam member.

3. The locking device according to claim 1 wherein the clamping surface and the force receiving surface define an included obtuse angle.

4. The locking device according to claim 3 wherein the included obtuse angle is approximately 150°.

5. The locking device according to claim 1 wherein the gib groove includes a bottom wall, and wherein the second wall is a sidewall opposite the gib surface and is substantially perpendicular to the bottom wall of the groove.

6. The locking device according to claim 1 further comprising means for attaching a cutting tool to the second tool element.

7. The locking device according to claim 6 further comprising a second means for attaching the first tool element to a rotatable cutting head.

8. The locking device according to claim 1 wherein said second tool element is mounted in said groove for sliding movement parallel to the length of said gib surface.

9. The locking device according to claim 1 wherein said gib surface comprises a female gib and said gib engaging clamping surface comprises a male gib.

10. The locking device according to claim 1 wherein said force applying member comprises a threaded element arranged to advance towards and recede away from said force receiving surface upon its rotation in opposite directions.

11. The locking device according to claim 1 wherein said force receiving surface extends only partially along the length of said cam member, and wherein said cam member is in close fitting engagement with said cylindrical opening along the remainder of its length.

12. The locking device according to claim 1 wherein said gib groove includes a sidewall opposite said gib surface and a bottom wall extending between the gib surface and the sidewall; either of said sidewall and bottom wall comprising said second wall; said second tool element includes bottom and sidewall surfaces contiguous with said bottom wall and sidewall of said groove; said groove sidewall, gib surface and groove bottom wall, with said bottom and sidewall surfaces of said second tool element, defining said contiguous tool surfaces, and wherein said cam member and force exerting means are arranged so that, upon a force being applied against said force receiving surface, said reaction force between said cam member and said gib surface also cause at least one of said bottom and sidewall surfaces of said second tool element to seat against at least an adjacent one of said bottom wall and sidewall of said grove.

13. The locking device according to claim 12 wherein said force exerting means is arranged such that, upon its exerting a force against said force receiving surface, said reaction force between said cam member and said gib surface also causes both said bottom and said sidewall surfaces of said second tool element to seat against the adjacent respective bottom wall and side wall of said groove.

* * * * *